United States Patent
Bolohan et al.

(10) Patent No.: US 10,067,956 B2
(45) Date of Patent: *Sep. 4, 2018

(54) ENCODING A SCHEMA VERSION IN TABLE NAMES

(75) Inventors: Matthew Bolohan, Kitchener (CA); Robert Kroeger, Waterloo (CA)

(73) Assignee: Google LLC, Mountain View, CA (US)

(*) Notice: Subject to any disclaimer, the term of this patent is extended or adjusted under 35 U.S.C. 154(b) by 1016 days.

This patent is subject to a terminal disclaimer.

(21) Appl. No.: 13/563,465

(22) Filed: Jul. 31, 2012

(65) Prior Publication Data

US 2012/0296884 A1 Nov. 22, 2012

Related U.S. Application Data

(63) Continuation of application No. 13/249,474, filed on Sep. 30, 2011, now Pat. No. 8,244,699, which is a continuation of application No. 12/842,771, filed on Jul. 23, 2010, now Pat. No. 8,244,698.

(51) Int. Cl.
G06F 17/30 (2006.01)

(52) U.S. Cl.
CPC .. *G06F 17/30297* (2013.01); *G06F 17/30309* (2013.01)

(58) Field of Classification Search
CPC .................................................. G06F 17/30297
USPC ........................................................ 707/659
See application file for complete search history.

(56) References Cited

U.S. PATENT DOCUMENTS

| 5,787,437 A | 7/1998 | Potterveld et al. |
| 5,999,947 A * | 12/1999 | Zollinger et al. ............. 707/203 |
| 6,216,136 B1 * | 4/2001 | Ronstrom ..................... 707/203 |
| 7,287,034 B2 * | 10/2007 | Wong ................ G06F 17/30578 |
| | | 707/101 |

(Continued)

FOREIGN PATENT DOCUMENTS

| CN | 101178684 A | 5/2008 |
| CN | 101438261 A | 5/2009 |

OTHER PUBLICATIONS

International Search Report and Written Opinion of international application No. PCT/US2011/044706, dated Oct. 21, 2011, 11 pp.

(Continued)

*Primary Examiner* — Neveen Abel Jalil
*Assistant Examiner* — Dawaune Conyers
(74) *Attorney, Agent, or Firm* — Shumaker & Sieffert, P.A.

(57) ABSTRACT

The subject matter of this disclosure can be implemented in, among other things, a device that includes processors, a data repository, and a table version module configured to create a first version of a database within the data repository using a first version of a database schema that defines a set of tables for the database, and receive a result that is responsive to a command, such that when the result indicates a success condition, execution of the command allows access to data contained in the database and verification of the database schema version, wherein the result does not include database schema version information. The device further includes means for executing the command to access the data, wherein the command includes one or more encoded table names, and wherein each of the encoded table names included in the command is generated based on at least a database schema version identifier.

20 Claims, 5 Drawing Sheets

(56) References Cited

U.S. PATENT DOCUMENTS

| | | | |
|---|---|---|---|
| 7,739,680 | B1 | 6/2010 | Thakur et al. |
| 2005/0114404 | A1* | 5/2005 | Pintar et al. .................. 707/200 |
| 2006/0206540 | A1 | 9/2006 | Lehner |
| 2006/0294159 | A1 | 12/2006 | Dettinger et al. |
| 2007/0261049 | A1 | 11/2007 | Bankston et al. |
| 2007/0299858 | A1 | 12/2007 | Norcott |
| 2009/0183150 | A1 | 7/2009 | Felts |
| 2009/0276472 | A1 | 11/2009 | Subramanian et al. |
| 2010/0145962 | A1 | 6/2010 | Chen et al. |
| 2010/0257229 | A1 | 10/2010 | Bolohan et al. |
| 2010/0293334 | A1 | 11/2010 | Xun et al. |
| 2012/0023080 | A1 | 1/2012 | Bolohan et al. |
| 2012/0023143 | A1 | 1/2012 | Bolohan et al. |

OTHER PUBLICATIONS

Web SQL Database, Jun. 2010, http://dev.w3.org/html5/webdatabase.

Gmail for Mobile HTML5 Series: Suggestions for Better Performance, Jun. 10, 2009, http://googlecode.blogspot.com/2009/06/gmail-for-mobile-html5-series.html.

Office Action from U.S. Appl. No. 12/842,771, dated Nov. 25, 2011, 15 pp.

Response to Office Action dated Nov. 25, 2011, from U.S. Appl. No. 12/842,771, filed Feb. 24, 2012, 10 pp.

Notice of Allowance from U.S. Appl. No. 12/842,771, dated May 11, 2012, 12 pp.

Office Action from U.S. Appl. No. 13/249,474, dated Nov. 23, 2011, 16 pp.

Response to Office Action dated Nov. 23, 2011, from U.S. Appl. No. 13/249,474, filed Feb. 23, 2012, 11 pp.

Notice of Allowance from U.S. Appl. No. 13/249,474, dated May 10, 2012, 15 pp.

International Search Report and Written Opinion of international application No. PCT/US2011/044706, dated Jan. 31, 2013, 8 pp.

Office Action from Korean Application No. 2013-7001742, dated Apr. 26, 2014, 8 pp.

First Office Action and Search Report, and translation thereof, from counterpart Chinese Application No. 201180036085.3, dated Jul. 17, 2015, 11 pp.

Response to European Communication pursuant to Article 94(3) dated Nov. 2, 2017, from European application No. 11 738 562.5-1871, filed Feb. 16, 2018, 21 pp.

Communication Pursuant to Article 94(3) EPC dated Jun. 13, 2018 from counterpart European Application No. 11738562.5, 4 pp.

Response to Communication Pursuant to Article 94(3) EPC dated Jun. 13, 2018 from counterpart European Application No. 11738562.5, filed Jul. 4, 2018, 5 pp.

* cited by examiner

ENCODING A SCHEMA VERSION IN TABLE NAMES

This application is a continuation of U.S. application Ser. No. 13/249,474, entitled "ENCODING A SCHEMA VERSION IN TABLE NAMES," filed on Sep. 30, 2011, which is a continuation of U.S. application Ser. No. 12/842,771, entitled "ENCODING A SCHEMA VERSION IN TABLE NAMES," filed on Jul. 23, 2010, each assigned to the assignee of the present application. The subject matter of each of the above-identified commonly owned applications is incorporated herein by reference.

TECHNICAL FIELD

The disclosure relates to databases stored on and/or used by computing devices, such as personal computers, tablet computers, and cellular telephones.

BACKGROUND

In a typical network computing environment, a computing device may communicate with one or more external devices via one or more communication networks. For example, a client device may communicate with a server via a wired or wireless network. In some cases, the network may comprise the Internet and the external devices may comprise web servers.

Some devices provide the benefit of being portable while allowing a user to perform functions previously reserved for desktop computers. However, mobile devices generally have more limited resources, such as slower processors and storage devices, than desktop computers. The limited resources may limit the capabilities of the mobile devices or provide a suboptimal user experience. Some mobile devices are capable of accessing the Internet, executing applications, playing videos and music, as well as providing functionality of a traditional cellular phone. For example, a mobile device may provide a user of the mobile device a Web browser where the user can input a Web address for a website and download content from the website for presentment on the mobile device.

Some applications or websites store a copy of information used by the application or website within the mobile device. The local copy of the information may be stored in tables of a database corresponding to a particular version of the database schema. Conventionally, when an application starts up, the application executes a query to determine the current database schema version and, if the current version is the same as the expected version, executes subsequent commands, e.g., structured query language (SQL) statements, as needed.

SUMMARY

In general, this disclosure describes techniques for encoding a database schema version identifier into the table names of the database to reduce the number of queries that are used when launching an application. For example, upon launching an application, a device may immediately execute an initial query to retrieve substantive data from a data repository located within the device without first determining if the database schema version of the data repository is the same as the expected database schema version. The initial query may include one or more table names encoded with the expected database schema version. If the query returns an error, the expected database schema version is not the same as the database schema version used to create the database and the updated database schema is installed. However, if the query returns results other than an error, the expected database schema version is the same as the database schema version used to create the database and the application executes additional queries, as needed.

In one example, a computer-readable storage medium encoded with instructions for causing one or more programmable processors to create a first version of a database using a first version of a database schema that defines a set of tables for the database, and execute a command to access data contained in the database, wherein the command includes one or more encoded table names, and wherein each of the one or more encoded table names included in the command is generated based on at least a database schema version identifier. The instructions also cause the one or more programmable processors to receive a result that is responsive to the command, such that when the result indicates a success condition, the execution of the command allows access to the data contained in the database and further allows verification of the first version of the database schema, wherein the result does not include database schema version information.

In another example, a method includes creating a first version of a database using a first version of a database schema that defines a set of tables for the database, and executing a command to access data contained in the database, wherein the command includes one or more encoded table names, and wherein each of the one or more encoded table names included in the command is generated based on at least a database schema version identifier. The method also includes receiving a result that is responsive to the command, such that when the result indicates a success condition, the execution of the command allows access to the data contained in the database and further allows verification of the first version of the database schema, wherein the result does not include database schema version information.

In another example, a device includes one or more processors, a data repository configured to store data, and a table version module configured to create a first version of a database within the data repository using a first version of a database schema, wherein the first version of the database schema defines a set of tables for the database, and receive a result that is responsive to a command, such that when the result indicates a success condition, execution of the command allows access to data contained in the database and further allows verification of the first version of the database schema, wherein the result does not include database schema version information. The device also includes means for executing the command to access the data contained in the database, wherein the command includes one or more encoded table names, and wherein each of the one or more encoded table names included in the command is generated based on at least a database schema version identifier.

The techniques of this disclosure may provide several advantages. For example, these techniques may enable an application to use a single command, e.g., a single query, during application startup to both retrieve data stored in a database and to verify the database schema version used to generate the database. That is, these techniques may reduce the number of queries executed against a database during application startup, decreasing the amount of time required to launch the application. By executing the initial data request query without first performing an explicit database schema version check, the techniques of this disclosure may provide a minimal or potentially zero-cost solution whenever the database schema does not change. Furthermore, decreasing the application launch time increases the application's responsiveness, which may result in a better user experience for the user.

The details of one or more examples are set forth in the accompanying drawings and the description below. Other features, objects, and advantages will be apparent from the description and drawings, and from the claims.

BRIEF DESCRIPTION OF DRAWINGS

Like reference symbols in the various drawings indicate like elements.

DETAILED DESCRIPTION

Figure 1:
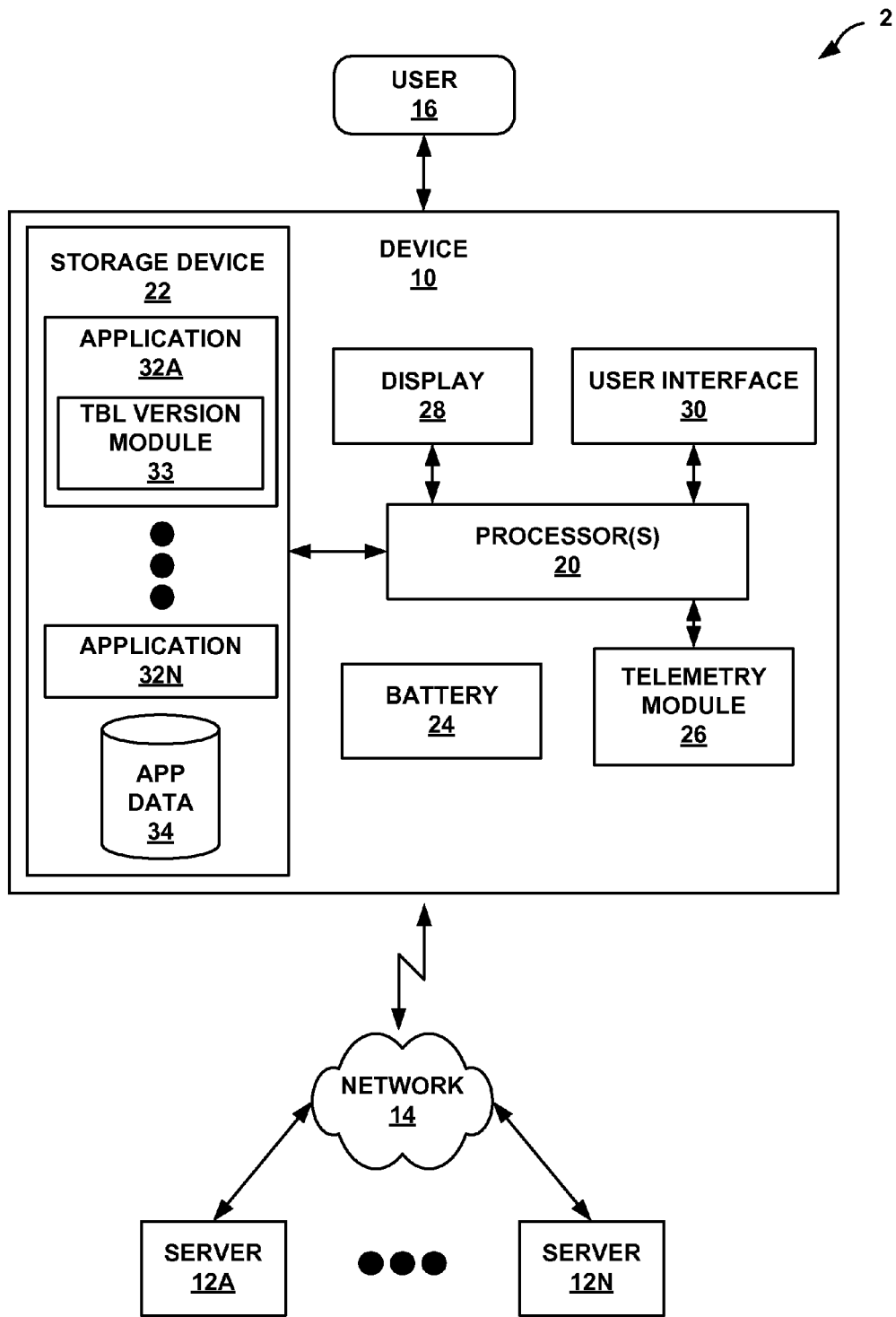
FIG. 1 is a block diagram illustrating an example networked computing environment with applications running on a client device, in accordance with one aspect of the present disclosure.

FIG. 1 is a block diagram illustrating an example networked computing system 2 with applications running on a client device 10, in accordance with one aspect of the present disclosure. As shown in FIG. 1, computing system 2 includes device 10, one or more servers 12A-12N ("servers 12"), and network 14. Examples of device 10 include, but are not limited to, portable or mobile devices such as cellular phones, personal digital assistants (PDAs), laptop computers, portable gaming devices, portable media players, e-book readers, watches, as well as non-portable devices such as desktop computers. For purposes of illustration only in this disclosure, device 10 is described as a portable or mobile device that a user can carry, but aspects of this disclosure should not be considered limited to portable or mobile devices.

Device 10 and servers 12 are coupled to network 14 via wired and/or wireless links. Device 10 may send data to or receive data from servers 12 via network 14. Network 14 may include a wide-area network such as the Internet, a local-area network (LAN), an enterprise network, or one or more other types of networks. Servers 12 may be any of several different types of network devices. For instance, servers 12 may be conventional web servers, specialized media servers, personal computers operating in a peer-to-peer fashion, or other types of network devices.

Device 10 may include one or more processors 20, storage device 22, battery 24, telemetry module 26, display 28, and user interface 30. In examples where device 10 is a cellular phone, device 10 includes a microphone and speaker (not shown) for voice communication. Battery 24 provides power for all the various units of device 10, and may be rechargeable. Examples of battery 24 include a lithium polymer battery, a lithium ion battery, nickel cadmium battery, and a nickel metal hydride battery. User interface 30 allows a user of device 10, e.g., user 16, to interact with device 10. Examples of user interface 30 include a keypad embedded on device 10, a keyboard, a mouse, a roller ball, buttons, or other devices that allow user 16 to interact with device 10. In some examples, user interface 30 may include a microphone to allow user 16 to provide voice commands.

Display 28 may be a liquid crystal display (LCD), e-ink, or other display. Display 28 presents the content of device 10 to user 16. For example, display 28 may present the applications executed on device 10 such as a web browser or a video game, content retrieved from servers 12, and other functions that may need to be presented to user 16. In some examples, display 28 may provide some or all of the functionality of user interface 30. For example, display 28 may be a touch screen that allows user 16 to interact with device 10.

Although device 10 is shown as including display 28, aspects of this disclosure should not be considered limited to examples that include display 28. In some examples of device 10, display 28 may be optional. For example, if device 10 comprises a music player or a radio, device 10 may not include a display 28.

Storage device 22 stores instructions for applications that may be executed by one or more processors 20. For purposes of illustration only in the following description, the applications that may be executed by one or more processors 20 are described below as being executed by one processor 20. The applications may be downloaded by user 16 via network 14 (e.g., from one or more of servers 12) or may be preprogrammed within device 10. The applications may be executed by processor 20 in response to user 16 interacting with device 10 to execute the applications. The applications may also be executed by processor 20 when user 16 turns on device 10.

Storage device 22 may also include instructions that cause processor 20 to perform various functions ascribed to processor 20 in this disclosure. Storage device 22 may comprise a computer-readable, machine-readable, or processor-readable storage medium that comprises instructions that cause one or more processors, e.g., processor 20, to perform various functions. Storage device 22 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. In some embodiments, storage device 22 may comprise one or more of a non-transitory/tangible storage media, where the data stored in such media may or may not change (e.g., ROM, RAM).

User 16 may interact with user interface 30 and/or display 28 to execute one or more of the applications stored on storage device 22. Some applications may be executed automatically by device 10 such as when device 10 is turned on or booted up. In response, processor 20 executes the one or more applications selected by user 16, or executes the one or more applications executed by device 10. Processor 20 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 20, in this disclosure, may be embodied as software, firmware, hardware or any combination thereof.

Processor 20 may execute one or more of applications 32A-32N (collectively, "applications 32") either alone or simultaneously. Examples of applications 32 include web browsers, e-mail, programs to retrieve stock quotes, programs to search for restaurants, programs that retrieve current and future weather information, games, a program to search the Internet, a program that provides news, a program that provides maps, and other programs executed by processor 20. Applications 32 may be executed based on a request from user 16, and may be terminated based on a request from user 16. Some applications 32 may be running continuously in the background. Some applications 32 may be executed automatically by device 10 such as at power up and may be terminated automatically by device 10 such as at power down.

In some examples, any application executed by processor 20 may require data from one or more of servers 12. Telemetry module 26 transmits a request for the data and receives the data from one or more of servers 12. Telemetry module 26 may provide the received data to processor 20 for further processing. Telemetry module 26 is configured to transmit data/requests to and receive data/responses from one or more servers 12 via network 14. Telemetry module 26 may support wireless or wired communication, and includes appropriate hardware and software to provide wireless or wired communication. For example, telemetry module 26 may include an antenna, modulators, demodulators, amplifiers, and other circuitry to effectuate communication between device 10 and one or more of servers 12.

As one example, storage device 22 may store application instructions associated with the Google Chrome web browser, e.g., application 32A. User 16 may interact with user interface 30 and/or display 28 to execute the web browser. Processor 20 then executes the web browser application and causes display 28 to display a web browser to user 16. User 16 may then interact with user interface 30 and/or display 28 to enter a website, such as http://www-.google.com, into the displayed web browser. In this example, telemetry module 26 transmits a request to one or more of servers 12, via network 14, for the requested website. Display 28 then presents the received website content to user 16.

In some examples, the website is a mobile email interface for an email application hosted by one or more of servers 12, e.g., a mobile Gmail interface for the Google Gmail application. For purposes of simplicity, this example will be described with respect to server 12A hosting the email application. In other examples, the email application may be hosted by any one of servers 12 or by any combination of servers 12 using, for example, clustering or other distributed application management techniques. In this example, telemetry module 26 transmits a request to server 12A for the mobile email interface and receives computer instructions for retrieving additional information and for displaying the information to user 16 via display 28. The additional information retrieved from server 12A may include user data, such as email messages sent and received by user 16, attachments, and configuration information.

The mobile email interface may include instructions that cause device 10 to store a local copy of the user data stored within server 12A. For example, the local copy of the user data may be stored within an application data repository ("APP DATA") 34 of device 10. Application data repository 34 may be configured as a database, flat file, table, or other data structure stored within storage device 22 of device 10. In some examples, application data repository 34 is shared between applications executing on device 10. In other examples, a different application data repository 34 is configured for each application executing on device 10 that requires a data repository. Each application data repository 34 may be configured and managed by different applications and may store data in a different manner.

For example, application data repository 34 may be configured to include one or more databases having a particular structure. Each database may correspond to a particular website or application executing on device 10. In general, the structure of a database is defined by tables, fields, relationships between tables, indexes, and other elements. The structure of a database is typically referred to as a database schema. Over time, the structure of a database may change, resulting in multiple versions of the database schema for the same database. Each version of the database schema may have a unique version identifier.

Upon receiving the instructions that cause the web browser application to store a local copy of the user data associated with the mobile email interface within a data repository of device 10, the web browser application (e.g., application 32A) creates the database using, for example, table version module ("TBL VERSION MODULE") 33. In general, table version module 33 ensures that the proper version of the database required by application 32A is maintained within application data repository 34. In some examples, table version module 33 is configured to generate a request for an updated database schema from one over servers 12 in response to determining that the database for application 32A is based on the incorrect database schema version.

In accordance with the techniques of this disclosure, the database is created based upon a database schema received from one or more of servers 12, e.g., server 12A. The table names in the received database schema may include encoded table names. In one embodiment, the encoded table names include a base portion and a database schema version identifier that identifies the version of the database schema received from the one or more of servers 12. In this embodiment, the database schema version identifier is appended to the base portion to generate the encoded table name. The base portion of the encoded table name is the portion of the encoded table name that typically remains constant between different database schema versions. While the base portion of the encoded table name may be changed between database schema versions, the changes to the base portion do not indicate the particular schema version. In contrast, the database schema version identifier appended to the base portion of the encoded table name changes each time the database schema version changes. For example, if the database schema is version two, each base portion of the encoded table name has "_2" appended to it, or for version three, each base portion of the table name has "_3" appended to it. The version identifier appended to the base portion of each encoded table name may be any string that is associated with a particular version.

In another embodiment, the encoded table name for each table in the database schema is generated by at least applying the database schema version identifier to an unencoded table name to create a unique hash. The hash may be created by encoding the unencoded table name with a key, where the key is the database schema version identifier. The unencoded table name, in some examples, is the same as the base portion of the encoded table name described in the previous embodiment. That is, any changes to the unencoded table name are not indicative of a particular schema version. Rather, the unencoded table name may identify a particular table irrespective of the database schema version. In general, when a programmer updates the database schema associated with the mobile email interface, the programmer also updates the version identifier. The updated version identifier is used to generate the encoded table names corresponding to the database schema version identified by the version identifier, as described above.

To display the mobile email interface to user 16 via display 28, the web browser application processes the instructions received from one or more of servers 12, e.g., server 12A. The received instructions may include instructions that cause the web browser to retrieve information from the local copy of the user data stored within the database created for the mobile email interface. Various programming languages may be used for retrieving data stored within a data repository including, but not limited to, Structured Query Language (SQL), Common Query Language (CQL), Object Query Language (OQL), XQuery, and XSQL. The instructions used for retrieving the data from the data repository may be combined with one or more different programming languages used to display the information in the web browser application. The instructions for displaying the mobile email interface may be encoded using Hypertext Markup Language (HTML), JavaScript, PHP Hypertext Processor, Java, Common Gateway Interface (CGI), or Perl, for example.

Combining the display instructions with the data retrieval instructions may enable the dynamic generation of the specific data retrieval instructions. For example, the instruction "'SELECT action FROM action_table'+schema_version+'WHERE action=2'" may be a combination of SQL and JavaScript where "schema_version" is a JavaScript variable that is substituted for some value corresponding to an expected version of the database schema when the web browser executes the instructions and where "+" is a symbol for concatenation. The expected version of the database schema is the version of the database schema used when programming the instructions received from server 12A and being processed by device 10. In another example, in the instruction "'SELECT action FROM'+action_table_name+'WHERE action=2'", the variable "action_table_name" may be substituted for an encoded table name where the encoded table name is a unique has value when the web browser executes the instructions.

Upon visiting the mobile web interface, the instructions received from server 12A cause the web browser to query the database without first determining if the database for the mobile email interface is based on the expected version of the database schema or if the database exists within the data repository. When a programmer updates the database schema, the programmer also updates the version identifier included in the instructions for the mobile email interface. The updated database schema identifier included in the instructions may be used to dynamically generate the table names for each version of the database schema as described above.

In this manner, the web browser application processes the received instructions for the mobile email interface and queries the data repository without first checking the database schema version. In general, checking the current schema version of the database each time an application launches or a website is loaded increases the application launch time and reduces the quality of the user experience. By not checking the database schema version prior to executing substantive queries, the application launch time may be reduced and the quality of the user experience improved. That is, using a single command, e.g., a single query, to both retrieve data from a database and verify that the database schema version used to generate the database is the same as the expected schema version may reduce the application launch time as compared to using multiple commands to check the database schema version and then retrieve data from the database.

Instead of first checking the database schema, the techniques of this disclosure ensure that the current database schema is the expected database schema by dynamically generating the table name(s) included in the queries with the expected database schema version appended. By appending the database schema version to the table names in the queries, the query will return an error condition if the database for the mobile email interface was not generated with the expected schema version or if the database for the mobile email interface has not yet been created. If the query returns a set of results, the database for the mobile email interface both exists and was generated based on the expected version of the database schema. Encoding the database schema version into the table names enables the mobile email interface to skip performing a query to check the database schema version, speeding up application startup.

When the database does not yet exist, e.g., user 16 has not visited the mobile email interface website before, the mobile email interface attempts to perform the first query against the database and receives an error status in response to the query. In response to the error status, the web browser application causes telemetry module 26 to send a request for the database schema. After receiving the database schema from server 12A, the web browser application applies the database schema to the data repository and creates the database for the mobile email interface based on the database schema.

The web browser application continues to process the instructions for the mobile email interface received from server 12A, causing telemetry module 26 to send data requests to server 12A and receive data from server 12A in response to the data requests. The data received from server 12A may include email, contact information, configuration settings, display information, and control information, as examples. A subset of the information received from server 12A, e.g., the user data, is stored in the database generated based on the database schema. Other portions of the information received from server 12A may be used by the web browser application to render and display the mobile email interface via display 28.

User 16 may visit the mobile email interface using the web browser application from time to time. Each time user 16 visits the mobile email interface, server 12A sends instructions to device 10 to cause the web browser application to render and display the most recent version of the mobile email interface with the most recent version of the user data via display 28. On occasion, the database schema for the mobile email interface database may change. When the database schema changes, the database schema may not match the version of the database stored within device 10 causing a discrepancy between the expected structure of the local database and the actual structure of the local database. When there is such a discrepancy, the user data stored within the local data repository may be different than the user data expected by the mobile email interface.

For example, the data repository may be configured as database having a previous version of the database schema while the mobile email interface is configured to process information based on an updated database schema. The new version of the database schema may include various modifications to the database structure, such as adding or removing a table, adding or removing columns within a table, or modifying a name or data type for one or more columns of a table. Therefore, the instructions processed by the web browser application may include data retrieval instructions that are invalid when applied to the version of the data repository stored within device 10.

To update the local database, device 10 may recreate the local database based on the new database schema prior to retrieving the updated user data and prior to fully displaying the mobile email interface using display 28. The new database schema includes new table names having the new database schema version appended to each table name. In some examples, the user data stored in the old version of the database is migrated to the new database to reduce the amount of user data needing to be retrieved from server 12A. After updating the database, the table names of the database include the expected database schema version identifier and the web browser application processes the queries against the updated database to store and retrieve the relevant user data for the mobile email interface.

While described with respect to a mobile email interface viewed in a web browser application, any application that stores information in a local data repository may implement the techniques of this disclosure. For example, a gaming application may store social network information, such as information about "friends" of user 16, and game statistics, such as high scores achieved and awards received by user 16 and the "friends" of user 16. Each time the game application launches, it may connect to one or more of servers 12 to download updated social network information and game statistics for the friends of user 16, for example. When the database schema version changes, the version identifier encoded in the instructions for updating the locally stored user and social network information is also updated. Encoding the database schema version identifier into the table names enables the instructions to skip checking the database schema version used to create the local database and, instead, execute the first substantive query against the database.

If the first query returns results, the database schema used to generate the local database is the same as the expected version of the database schema, i.e., the current version implemented on the one or more of servers 12. By skipping the database schema version check, the number of queries is reduced and the application's responsiveness is increased, resulting in a better end user experience. Reducing the number of queries by verifying the database schema version and retrieving data from the database in a single command may decrease application startup time as compared to using multiple commands to first check the database schema version and then, in a separate command, retrieve data from the database. However, if the database schema version used to create the local database is not the expected version, then the updated database schema is retrieved from the servers 12 and applied to the database.

Figure 2:
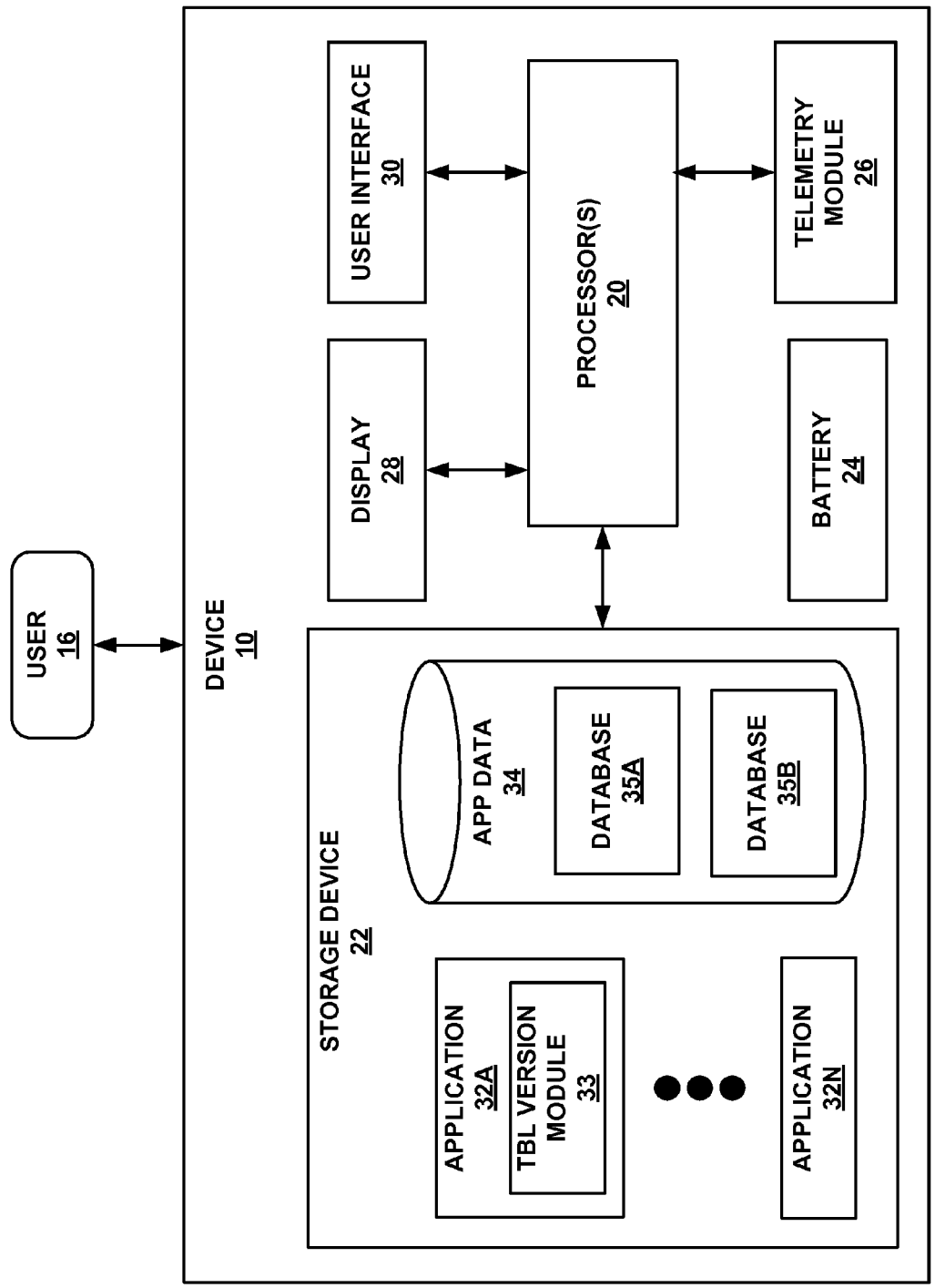
FIG. 2 is a block diagram illustration an example client device, in accordance with one aspect of the present disclosure.

FIG. 2 is a block diagram illustration an example client device, in accordance with one aspect of the present disclosure. As shown in FIG. 2, storage device 22 includes applications 32 and application data repository ("APP DATA") 34. Application data repository 34, as illustrated in FIG. 2, includes a database (not shown) configured with two databases, databases 35A and 35B (collectively, "databases 35"), each based on a different version of a database schema for one of applications 32, e.g., application 32A. Each of databases 35 may include tables, fields within each table, and relationships between tables. The database schema version upon which database 35A is based includes a different combination of tables, fields, and/or relationships as compared to the database schema version upon which database 35B is based. The different combination may include different fields, tables, or relationships, a different definition or field type for one or more fields, a renamed table or field, or a different number of tables, fields, or relationships, as examples.

In general, each of applications 32 manages its own respective databases within application data repository 34. When databases 35 are configured for application 32A, table version module 33 of application 32A may manage the generation, migration, and deletion of databases 35. As an example, application 32A creates a database, e.g., database 35A, within data repository 34 in response to launching for the first time, for example. During the initial launch of application 32A, table version module 33 determines that a database for application 32A does not exist within application data repository 34 and applies the desired version of the database schema for application 32A to data repository 34 to create database 35A. Using the desired version of the database schema to create database 35A causes database 35A to have the same database structure as defined by the desired version of the database schema. That is, database 35A includes a set of tables, each having an encoded table name. Each encoded table name may be encoded by applying the database schema version identifier to an unencoded table name to generate a hash value or by appending the database schema version identifier to a base portion of the encoded table name, as examples. The database schema version identifier portion of all of the table names may change each time the database schema version changes.

At a later time, such as after an update is applied to application 32A or after a database schema version received from one of servers 12 is updated, application 32A applies a query to database 35A that includes one or more encoded table names. In one example, the encoded table names are generated based on an unencoded table name and a version identifier that identifies a version of the database schema that is the same as the version used to create database 35A. Application 32A receives a result in response to applying the query to database 35A. Because the database schema version identifier identifies the same database schema version used to create database 35A, the result indicates a successful condition. That is, the single query allows access to the data stored in database 35A and further allows verification of the database schema version without including database schema version in the results.

In another example, the encoded table names are encoded using a version identifier corresponding to a version of the database schema that is different that then version used to create database 35A. In response to applying the query to database 35A, application 32A receives a response indicating that the specified tables do not exist. Table version module 33 may examine the response and determines that the response indicates an error condition. The error condition may indicate that the database schema version used to create database 35A is no longer the expected database schema version. In some examples, application 32A requests an updated database schema version from one of servers 12 of FIG. 1 via telemetry module 26. In other examples, application 32A includes the updated database schema version. Table version module 33 applies the updated database schema version to create database 35B. The encoded table names of the tables in database 35B include the database schema version identifier that corresponds to the updated database schema.

After creating database 35B, table version module 33 may migrate data stored in database 35A to database 35B. If, for example, one or more tables of database 35B include the same fields having the same field types as in database 35A, table version module 33 inserts the data from database 35A into the corresponding tables in database 35B. If, in another example, one or more field types change, a field is removed, or a table is removed in database 35B as compared to database 35A, at least a portion of the data stored in database 35A may not successfully migrated to database 35B. Instead, application 32A may request the information not migrated to database 35B from one of servers 12, for example. After populating database 35B with the appropriate data, application 32A may re-apply the previously failed query against database 35B and receive query results.

Figure 3A:
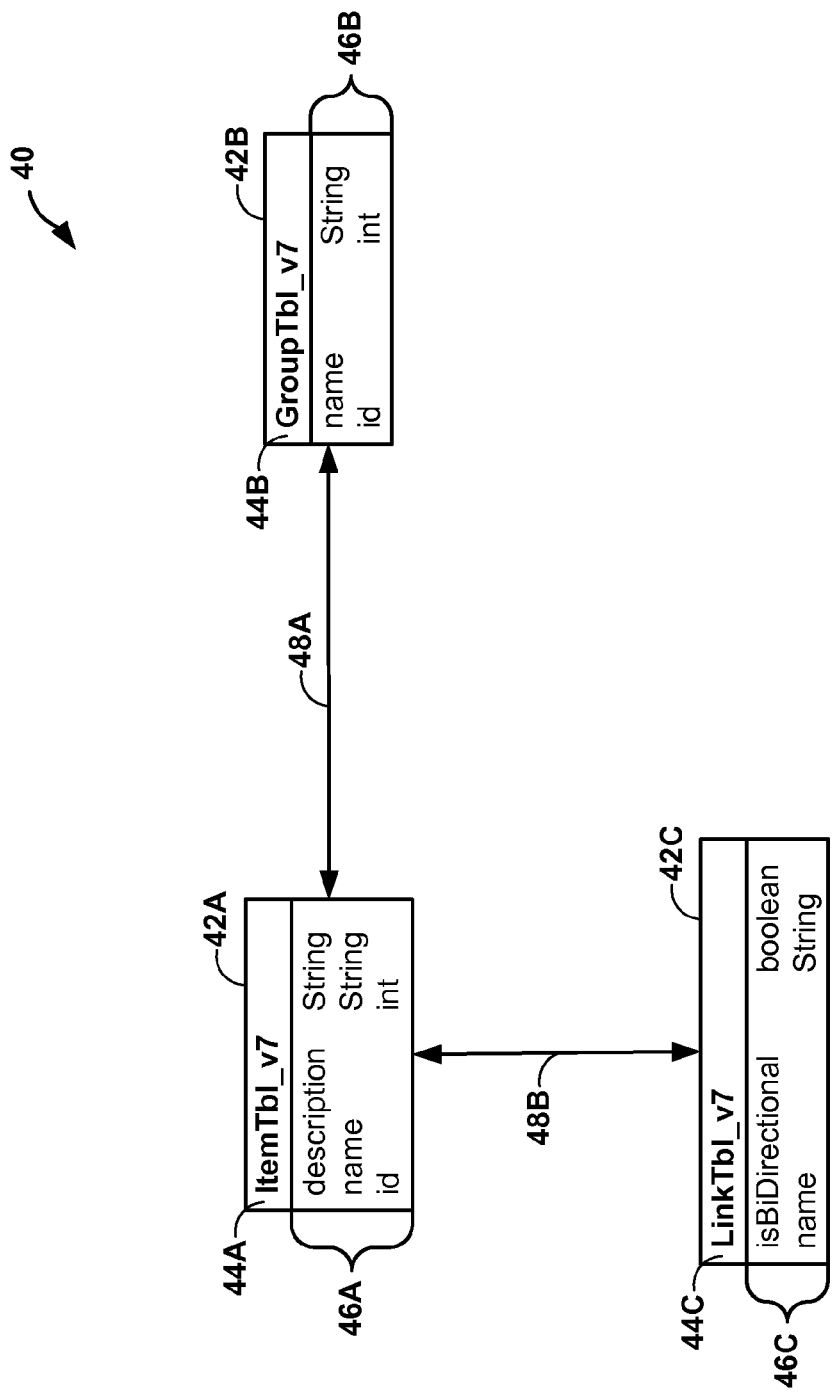
FIGS. 3A and 3B are conceptual diagrams illustrating examples of different versions of a database schema for an application, in accordance with one aspect of the present disclosure.
Figure 3B:
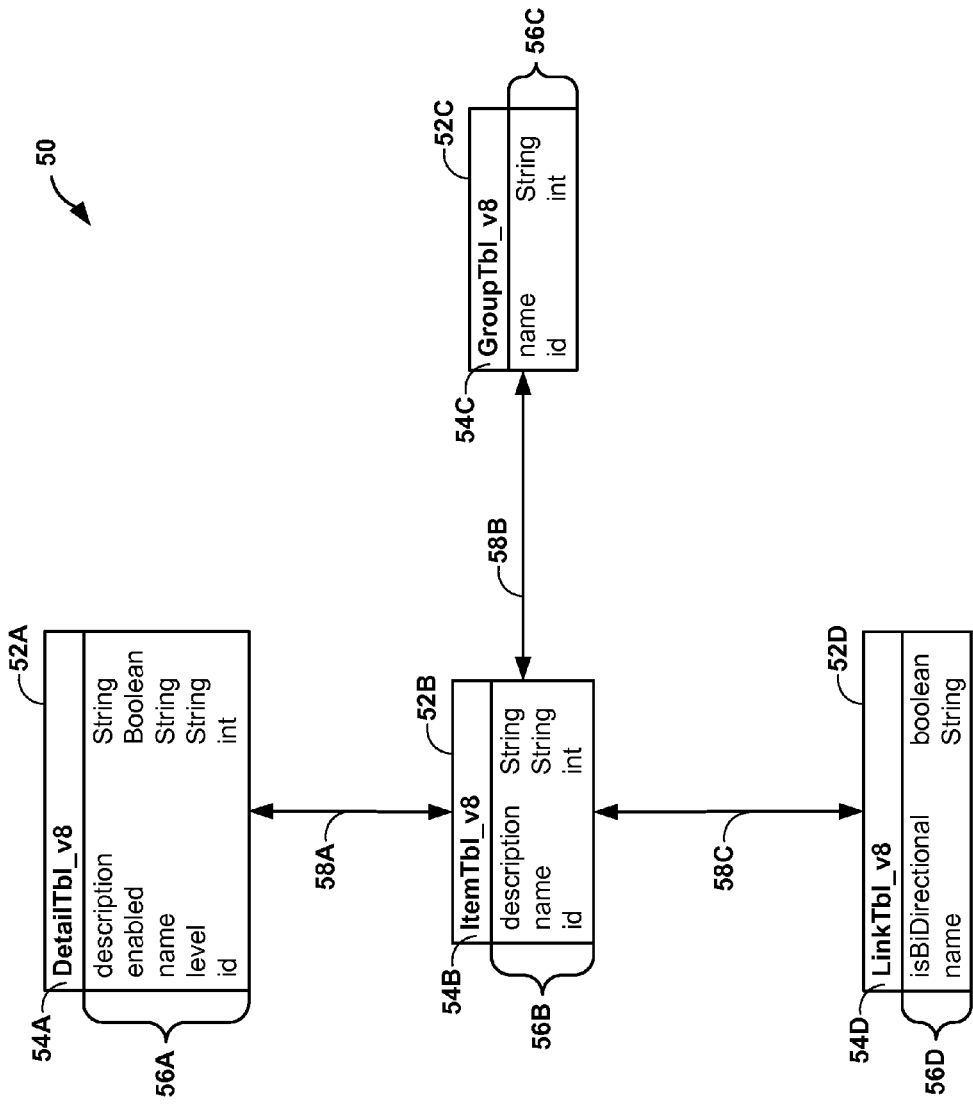

FIGS. 3A and 3B are conceptual diagrams illustrating examples of different versions of a database schema for an application, in accordance with one aspect of the present disclosure. FIG. 3A is an example of database schema 40 that defines tables 42A-42C (collectively, "tables 42"), each having a respective table name 44A-44C (collectively, "table names 44") and a set of fields 46A-46C (collectively, "fields 46"), and relationships 48A and 48B between tables 42 for a particular version of database schema 40. In this example, table 42A is named "ItemTbl_v7", table 42B is named "GroupTbl_v7", and table 42C is named "LinkTbl_v7". Each table name includes "_v7" appended to uniquely identify the version of database schema 40 illustrated in FIG. 2A, e.g., version seven. Relationships 48 indicate that a relationship exists between tables 42A and 42B as well as between tables 42A and 42C. Each of relationships 48 may be a many-to-many, a one-to-many, or a one-to-one relationship, for example.

FIG. 3B is an example of a database schema 50. Database schema 50 is, for example, a different version of database schema 40 illustrated in FIG. 3A. Database schema 50 defines tables 52A-52D ("tables 52"), each having a respective table name 54A-54D (collectively, "table names 54") and a set of fields 56A-56D (collectively, "fields 56"), and relationships 58A-58C (collectively, "relationships 58") between tables 52. In this example, table 52A is named "ItemTbl_v8", table 52B is named "GroupTbl_v8", table 52C is named "LinkTbl_v8", and table 52D is named "DetailTbl_v8". Each table name includes "_v8" appended to uniquely identify this version, e.g., version eight, of database schema 50. Relationships 58 indicate that a relationship exists between tables 52A and 52B, tables 52B and 52C, and tables 52B and 52D. Each of relationships 58 may be a many-to-many, a one-to-many, or a one-to-one relationship, for example.

Comparing database schema 40 of FIG. 3A and database schema 50 of FIG. 3B, which may be a subsequent version of database schema 40, database schema 50 includes an additional table, table 52A, which defines additional fields 56A for storing additional information as compared to database schema 40. While illustrated as including an additional table as compared to database schema 40, any change made to database schema 50 may be sufficient to generate a new database schema version and, therefore, new table names for the new database schema version. For example, changing a field type or name of one or more fields within fields 56, changing one or more of table names 54, adding or removing a field from fields 56, or redefining one or more relationships 58 between tables 52 may be sufficient to generate a new database schema version.

The instructions for storing and retrieving data from a database generated based on database schema 40 and a database generated based on database schema 50 may be substantially similar. For example, the instructions may include a combination of programming languages, as described above, to enable a dynamic table naming convention. In one example, the instructions include a variable, e.g., "schema_version", defined as storing the expected database schema version number. The instruction, "'SELECT description, id FROM ItemTbl'+schema_version+'WHERE id=3'", is one example of an instruction that combines SQL with JavaScript to dynamically generate the appropriate table name based on the expected database schema version defined within the "schema_version" variable. In this example, "schema_version" is set to the value "_v7" when the database schema illustrated in FIG. 3A is the expected database schema version. Similarly, "schema_version" is set to the value "_v8" when the database schema illustrated in FIG. 3B is the expected database schema version.

In one example, user 16 of FIG. 1 first launches an application that requires a database having the structure illustrated by database schema 40 of FIG. 3A. The database is generated based on database schema version seven (e.g., "_v7") illustrated in FIG. 3A. The application may query the database using commands that append the expected database schema version to the end of each table name using a variable that is set to the current expected database schema version, as described above. After user 16 completes using the application, the application quits. Prior to the user launching the application again, the expected database schema version changes, e.g., the database schema is updated to version eight (e.g., "_v8") as illustrated by database schema 50 of FIG. 3B. The database schema may be updated, for example, because the user updated the application stored within device 10 to a newer version or because a component of the application residing on one of servers 12 of FIG. 1 was updated.

Upon launching the application after the update, the dynamically generated table names may not match the table names of the existing database because, for example, the "schema_version" variable was updated to "_v8" from "_v7". In this example, the query "'SELECT description, id FROM ItemTbl'+schema_version+'WHERE id=3'" would generate the table name "ItemTbl_v8" and try to retrieve information from table having the name "ItemTbl_v8". However, the database for the application is still based on version seven of the database schema and, therefore, does not include the table names "ItemTbl_v8". Because the table does not exist in the database, the query returns an error.

In response to the error, the application applies the new version of the database schema, e.g., version eight as illustrated by database schema 50 of FIG. 3B, to create a new database. The new database includes tables having the expected database schema version identifier appended to the name of each time, e.g., "_v8". After creating the database based on the expected version of the database schema, the data stored in the prior version of the database may be migrated to the new database. As illustrated in FIGS. 3A and 3B, the tables 52A-52C of FIG. 3A are the same as corresponding tables 52B-52D in FIG. 3B. That is, table 42A and 52B each have the same fields defined within fields 46A and 56A, tables 42B and 52C each have same fields defined within fields 46B and 56C, and tables 42C and 52D each have the same fields defined within fields 46C and 56D. Therefore, the data may be migrated from tables 42 in the previous database to the corresponding tables 52 in the new database. After the data migration is complete, the application may re-execute the query. Because table "ItemTbl_v8" now exists within the database, the query will no longer return an error because of an invalid table name and, generally, will succeed and return a set of results.

Figure 4:
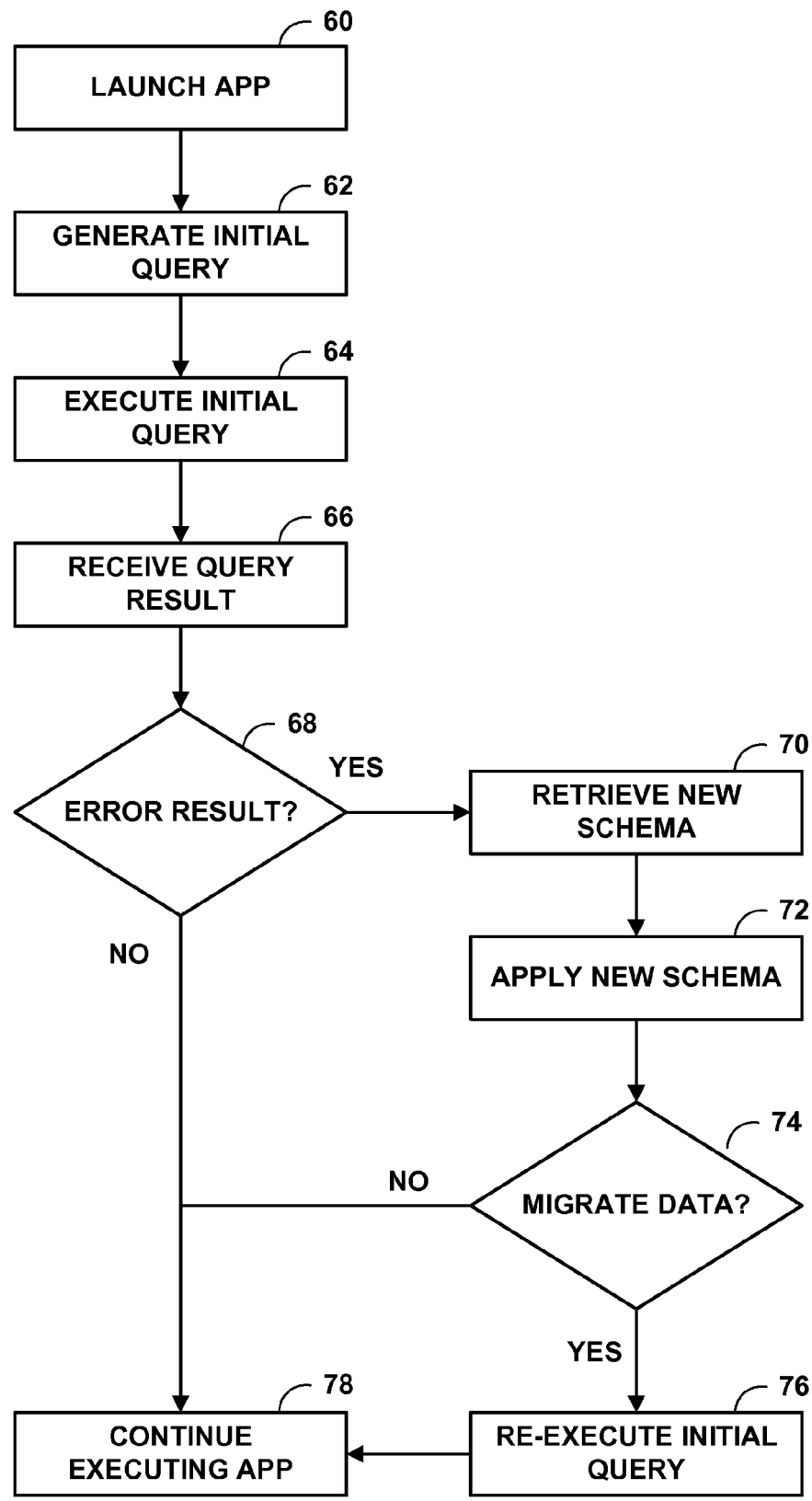
FIG. 4 is a flowchart illustrating an example method for loading an application, in accordance with one aspect of the present disclosure.

FIG. 4 is a flowchart illustrating an example method for loading an application, in accordance with one aspect of the present disclosure. For purposes of illustration only, the method of FIG. 3 is described with respect to computing system 2 of FIG. 1, though various other systems and/or devices may be utilized to implement or perform the method shown in FIG. 4.

User 16 interacts with device 10 and launches application 32A (60). In one example, application 32A is a web browser that user 16 directs to a website and the website is configured to store a local copy of user information within a database of application data 34. Telemetry module 26 sends a request for information to one or more of servers 12 and receives the information from the one or more of servers 12. The received information includes instructions that cause application 32A to render and display the website via display 28. A portion of the received information includes instructions that cause application 32A to retrieve a set of information from a database of application data 34.

Application 32A then executes the instructions to generate the initial query (62). As described above, the query may include dynamically generated table names. The generated table names include a base portion of the table name that is appended with a database schema version identifier that is changed each time a new database schema version is implemented on the one or more of servers 12. The appended database schema version identifier is included in the received instructions and corresponds to the database schema version used when programming the received instructions. That is, the expected database schema version is the particular database structure upon which the received instructions are based. If the database stored within storage device 22 does not have the same structure as the expected database schema version, executing the instructions may produce unpredictable results or may cause various error conditions.

Application 32A executes the generated query (64) and receives the results from the query (66). The results may include data retrieved from the database, an indication that no data matched the query, or an indication of an error condition, for example. Application 32A processes the results and determines if the results indicate an error condition (68). If the results do not indicate an error condition ("NO" branch of 68), then application 32A continues to process queries against the database as needed to perform the functions of application 32A (74). The results do not indicate an error condition if, for example, the results include data or an indication that no data matched the query.

If the results indicate an error condition ("YES" branch of 68), application 32A retrieves the new database schema from the one or more of servers 12 (70). Application 32A causes telemetry module 26 to send a request for the version of the database schema that corresponds to the expected database schema version indicated in the received instructions to the one or more of servers 12. Telemetry module 26 then receives the new database schema from the one or more of servers 12 and passes the new database schema to application 32A.

Application 32A then applies the new database schema to generate a new database based on the new database schema (72). The new database includes tables having names with the expected database schema version appended. If possible, application 32A migrates the data stored in the old version of the database to the new database (74). If the data is successfully migrated to the new database ("YES" branch of 74), application 32A may re-execute the initial query (76) to retrieve the data originally requested by application 32A. After re-executing the initial query (76), application 32A continues executing instructions and may execute additional queries against the new database as required (78). If the data is not migrated to the new database ("NO" branch of 74), application 32A may then proceed based on the tables of the new database being empty, e.g., application 32A may execute queries to populate the new database with data from the one or more of servers 12, for example, and may executing additional queries against the new database as needed to perform the various functions of application 32A (78).

In this manner, the techniques of this disclosure may provide a minimal or even substantially zero-cost solution, in some cases, for verifying that the local database is based on the same database schema version as the expected database schema version for each application startup between database schema changes. That is, the techniques may enable an application to skip performing an explicit database schema version check on application startup by verifying the database schema version and retrieving data from the database in a single command, thereby reducing the number of queries required during application startup and facilitating faster application startup as compared to using multiple commands to first check the database schema version and then retrieve data from the database. When the database schema has changed, i.e., the database structure corresponds to a database schema version that is not the same as the expected database schema version, the techniques may migrate the database schema to the expected database schema version without any additional overhead as compared to the conventional solution. Therefore, the overall efficiency of the application startup may be improved.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as RAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the disclosure have been described. These and other embodiments are within the scope of the following claims.

The invention claimed is:

1. A computer-readable storage medium encoded with instructions for causing one or more programmable processors to:
   create a first version of a database using a first version of a database schema that defines a set of tables for the database;
   without first performing an explicit database schema version check, execute a single command to verify a database schema version of the database and retrieve a set of access information contained in the database, wherein the single command includes one or more encoded table names, wherein each of the one or more encoded table names included in the single command is generated based on at least a first database schema version identifier, wherein the one or more encoded table names generated based on the first database schema version identifier that identifies the first version of the database schema for the database are different from one or more encoded table names generated based on a second database schema version identifier that identifies a second version of the database schema for the database, and wherein the first version of the database schema and the second version of the database schema are different database schemas for the database; and
   receive a result that is responsive to the single command, such that, when at least one of the one or more encoded table names included in the single command corresponds to a name of a table of the database, the result 1) indicates a success condition of the single command and 2) includes the set of the information contained in the database.

2. The computer-readable storage medium of claim 1, wherein each table of the set of tables of the database includes an encoded table name,
   wherein the encoded table name of each table is generated based on an unencoded table name and the first database schema version identifier that identifies the first version of the database schema, and
   wherein the result indicates a success condition when each of the one or more encoded table names included in the single command is generated based on one of the unencoded table names of the set of tables and on the first database schema version identifier that identifies the first version of the database schema.

3. The computer-readable storage medium of claim 2, wherein the encoded table name of each table is generated by at least applying the first database schema version identifier to the corresponding unencoded table name to create a unique hash.

4. The computer-readable storage medium of claim 2, wherein the encoded table name of each table includes a first portion and a second portion, wherein the first portion of each encoded table name includes the corresponding unencoded table name, and wherein the second portion of each encoded table name includes the first database schema version identifier.

5. The computer-readable storage medium of claim 1, further encoded with instructions for causing the one or more programmable processors to:
   determine that the result indicates an error condition when each of the one or more encoded table names included in the single command is generated based on an unencoded table name and the second database schema version identifier that identifies the second version of the database schema; and
   create a second version of the database using the second version of the database schema in response to determining that the result indicates the error condition.

6. The computer-readable storage medium of claim 5, wherein the second version of the database schema defines a second set of tables each having an encoded table name,
   wherein the encoded table name of each table in the second version of the database schema includes a first portion and a second portion,
   wherein the first portion of each encoded table name in the second version of the database schema is the same as a first portion of the encoded table name of a corresponding table in the first version of the database schema, and
   wherein the second portion of each encoded table name in the second version of the database schema includes the second database schema version identifier that identifies the second version of the database schema.

7. The computer-readable storage medium of claim 5, further encoded with instructions for causing the one or more programmable processors to retrieve the second version of the database schema from a server via a network.

8. The computer-readable storage medium of claim 5, further encoded with instructions for causing the one or more programmable processors to migrate information stored within the database created using the first version of the database schema to the second version of the database created using the second version of the database schema.

9. The computer-readable storage medium of claim 1, wherein the single command is an initial command of an application executed in response to application startup.

10. A method comprising:
    creating a first version of a database using a first version of a database schema that defines a set of tables for the database;
    without first performing an explicit database schema version check, executing a single command to verify a database schema version of the database and retrieve a set of access information contained in the database, wherein the single command includes one or more encoded table names, and wherein each of the one or more encoded table names included in the single command is generated based on at least a database schema version identifier, wherein the one or more encoded table names generated based on a first database schema version identifier that identifies the first version of the database schema for the database are different from one or more encoded table names generated based on a second database schema version identifier that identifies a second version of the database schema for the database, wherein the first version of the database schema and the second version of the database schema are different database schemas for the database; and
    receiving a result that is responsive to the single command, such that, when at least one of the one or more encoded table names included in the single command corresponds to a name of a table of the database, the result 1) indicates a success condition of the single command and 2) includes the set of the information contained in the database.

11. The method of claim 10,
wherein each table of the set of tables of the database includes an encoded table name, wherein the encoded table name of each table is generated based on an unencoded table name and the first database schema version identifier that identifies the first version of the database schema, and
wherein the result indicates a success condition when each of the one or more encoded table names included in the single command is generated based on one of the unencoded table names of the set of tables and on the first database schema version identifier that identifies the first version of the database schema.

12. The method of claim 11, wherein the encoded table name of each table is generated by at least applying the first database schema version identifier to the corresponding unencoded table name to create a unique hash.

13. The method of claim 11, wherein the encoded table name of each table includes a first portion and a second portion, wherein the first portion of each encoded table name includes the corresponding unencoded table name, and wherein the second portion of each encoded table name includes the first database schema version identifier.

14. The method of claim 10, further comprising:
determining that the result indicates an error condition, wherein each of the one or more encoded table names included in the single command is generated based on an unencoded table name and the second database schema version identifier that identifies the second version of the database schema that is different from the first version of the database schema; and
creating a second version of the database using the second version of the database schema in response to determining that the result indicates the error condition.

15. The method of claim 14,
wherein the second version of the database schema defines a second set of tables each having an encoded table name,
wherein the encoded table name of each table in the second version of the database schema includes a first portion and a second portion,
wherein the first portion of each encoded table name in the second version of the database schema is the same as a first portion of the encoded table name of a corresponding table in the first version of the database schema, and
wherein the second portion of each encoded table name in the second version of the database schema includes the second database schema version identifier that identifies the second version of the source database schema.

16. The method of claim 10, wherein the single command is an initial command of an application executed in response to application startup.

17. A device comprising:
one or more processors;
a data repository configured to store information;
a table version module operable by the one or more processors to create a first version of a database within the data repository using a first version of a database schema, wherein the first version of the database schema defines a set of tables for the database; and
an application operable by the one or more processors to, without first performing an explicit database schema version check, execute a single command to verify a database schema version of the database and retrieve a set of access information contained in the database, wherein the single command includes one or more encoded table names, wherein each of the one or more encoded table names included in the single command is generated based on at least a database schema version identifier, wherein the one or more encoded table names generated based on a first database schema version identifier that identifies the first version of the database schema for the database are different from one or more encoded table names generated based on a second database schema version identifier that identifies a second version of the database schema for the database, and wherein the first version of the database schema and the second version of the database schema are different database schemas for the database, and
wherein the table version module is further operable by the one or more processors to receive a result that is responsive to the single command, such that when at least one of the one or more encoded table names included in the single command corresponds to a name of a table of the database, the result 1) indicates a success condition of the single command and 2) includes a set of the information contained in the database.

18. The device of claim 17,
wherein each table of the set of tables of the database includes an encoded table name, wherein the encoded table name of each table is generated based on an unencoded table name and the first database schema version identifier that identifies the first version of the database schema, and
wherein the result indicates a success condition when each of the one or more encoded table names included in the single command is generated based on one of the unencoded table names of the set of tables and on the first database schema version identifier that identifies the first version of the database schema.

19. The device of claim 17, wherein the table version module is further configured to determine that the result indicates an error condition, wherein each of the one or more encoded table names included in the single command is generated based on an unencoded table name and the second database schema version identifier that identifies the second version of the database schema, and create a second version of the database using the second version of the database schema in response to determining that the result indicates the error condition.

20. The device of claim 19,
wherein the second version of the database schema defines a second set of tables each having an encoded table name,
wherein the encoded table name of each table in the second version of the database schema includes a first portion and a second portion,
wherein the first portion of each encoded table name in the second version of the database schema is the same as a first portion of the encoded table name of a corresponding table in the first version of the database schema, and
wherein the second portion of each encoded table name in the second version of the database schema includes the second database schema version identifier that identifies the second version of the source database schema.

* * * * *